(12) United States Patent
King et al.

(10) Patent No.: US 9,440,211 B2
(45) Date of Patent: Sep. 13, 2016

(54) PROCESS FOR CATALYST ACTIVATION

(71) Applicant: INEOS EUROPE AG, Vaud (CH)

(72) Inventors: Alex King, Surrey (UA); Stephen Kevin Lee, London (UA); Brent R. Walworth, Sint-Niklaas (BE)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/919,853

(22) Filed: Oct. 22, 2015

(65) Prior Publication Data

US 2016/0038900 A1 Feb. 11, 2016

Related U.S. Application Data

(62) Division of application No. 14/686,956, filed on Apr. 15, 2015, now Pat. No. 9,192,906, which is a division of application No. 13/885,847, filed as application No. PCT/EP2011/071259 on Nov. 29, 2011, now Pat. No. 9,034,057.

(30) Foreign Application Priority Data

Nov. 30, 2010 (EP) .................................... 10193118
Nov. 30, 2010 (GB) .................................... 1020224.0

(51) Int. Cl.
*B01J 8/24* (2006.01)
*B01J 8/44* (2006.01)
*B01J 23/26* (2006.01)
*B01J 37/08* (2006.01)
*C08F 4/24* (2006.01)
*C08F 10/00* (2006.01)
*C08F 4/78* (2006.01)

(52) U.S. Cl.
CPC .. *B01J 8/24* (2013.01); *B01J 8/44* (2013.01); *B01J 23/26* (2013.01); *B01J 37/08* (2013.01); *C08F 4/24* (2013.01); *C08F 4/78* (2013.01); *C08F 10/00* (2013.01); *B01J 2208/00212* (2013.01); *B01J 2208/00415* (2013.01); *B01J 2208/00884* (2013.01); *B01J 2208/00991* (2013.01)

(58) Field of Classification Search
CPC ........................................................ B01J 21/04
USPC ........................................................ 502/439
See application file for complete search history.

(56) References Cited

U.S. PATENT DOCUMENTS

| | | | |
|---|---|---|---|
| 2,825,721 A | 3/1958 | Hogan et al. | |
| 2,985,597 A | 5/1961 | Dye et al. | |
| 2,987,487 A | 6/1961 | Stevens et al. | |
| 2,990,260 A | 6/1961 | Mungen | |
| 3,089,251 A | 5/1963 | Helbig et al. | |
| 3,151,944 A | 10/1964 | Stevens et al. | |
| 3,238,023 A | 3/1966 | Craig et al. | |
| 3,288,767 A | 11/1966 | Hogan et al. | |
| 3,829,983 A | 8/1974 | White | |
| 3,925,258 A | 12/1975 | Cox | |
| 4,022,580 A | 5/1977 | Rush | |
| 6,559,087 B1 | 5/2003 | De Lange et al. | |
| 7,232,551 B1 | 6/2007 | De Lange et al. | |
| 2005/0255987 A1 | 11/2005 | McDaniel et al. | |

FOREIGN PATENT DOCUMENTS

| | | |
|---|---|---|
| DE | 198 47 647 A1 | 4/2000 |
| WO | WO 95/34379 A1 | 12/1995 |
| WO | WO 02/35206 A2 | 5/2002 |
| WO | WO 2004/024312 A1 | 3/2004 |
| WO | WO 2004/096438 A1 | 11/2004 |
| WO | WO 2006/026493 A1 | 3/2006 |

*Primary Examiner* — Edward Johnson
(74) *Attorney, Agent, or Firm* — Nixon & Vanderhye P.C.

(57) ABSTRACT

The invention relates generally to a catalyst activator, and in particular to a catalyst activator for heat conditioning a catalyst, comprising: a) a vessel for containing a catalyst charge having an internal diameter of at least 1.2 meters and/or an internal volume of at least 5 $m^3$; b) a fluidization grid plate disposed in said vessel, said fluidization grid plate and having an upper major surface and a lower major surface; c) an array of generally conical depressions in said upper major surface that overlap by less than 17%; and d) an array of holes perforating said fluidization grid plate, said holes extending from at least some of said generally conical depressions through said lower surface.

20 Claims, 1 Drawing Sheet

1a    1b

PROCESS FOR CATALYST ACTIVATION

Figure 1:
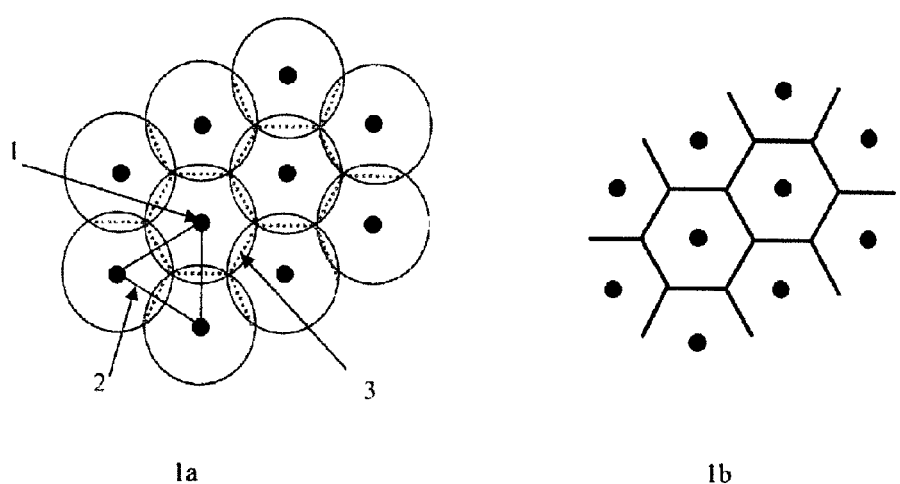

This application is a divisional of application Ser. No. 14/686,956 filed Apr. 15, 2015, which is a divisional of application Ser. No. 13/885,847 filed May 16, 2013 (U.S. Pat. No. 9,034,057) which is a 371 of PCT/EP2011/071259 filed Nov. 29, 2011, which claims priority to British Patent Application No. 1020224.0 filed Nov. 30, 2010, and European Patent Application No. 10193118.6 filed Nov. 30, 2010, the entire contents of each of which are hereby incorporated by reference.

The invention relates generally to a catalyst activator, and in particular to a catalyst activator for activating olefin polymerization catalysts.

Catalyst activation processes generally comprise heating a catalyst in the presence of an activating gas. The catalyst is usually activated as a fluidised bed, the fluidisation being achieved by passing the activating gas through a grid, known as a fluidisation grid, to fluidise the bed of catalyst particles held above the fluidisation grid.

A grid plate and catalyst activation using such a fluidisation grid plate are described, for example, in U.S. Pat. No. 3,829,983.

More recently, a catalyst activator vessel has been described in WO 2004/024312. According to this document, problems in scaling up catalyst activator vessels can be solved by specific design of the activator vessel fluidisation grid, which thereby allows diameters of greater than 50" (1.27 m) to be achieved. In particular, the activator vessel fluidisation grid plate can have conical depression which overlap by at least 17%, where the percentage overlap is defined as the amount, expressed as a percentage, by which the nominal diameter of a depression exceeds the centre-to-centre spacing between one depression and the nearest adjacent depression.

In general, the depressions in a fluidisation grid plate are formed in a triangular arrangement by drilling cones into a metal surface as described in WO 2004/024312. In such an arrangement each depression has 6 nearest neighbours spaced around it, and as neighbouring cones overlap they form an array of regular hexagons at the surface.

It can be shown that for an array of regular hexagons at a surface the percentage overlap in that surface is 15.5%. To achieve an overlap of greater than 17%, WO 2004/024312 defines a nominal upper surface in which the nominal diameter is measured. In effect, it is necessary to lower the surface in which the hexagons sit relative to the original surface of the plate in which the depressions are drilled by drilling further down into the original plate. This is shown in FIG. 4 of WO 2004/024312 as the nominal surface 52 which corresponds to the original surface of the plate, and which is reproduced as FIG. 2 herein. The array of regular hexagons as viewed from above does not change, but the depth of the surface in which the hexagons reside lowers relative to the original surface.

We have now found that it is advantageous to have an overlap, defined in the same manner as WO 2004/024312, of less than 17% even for large diameter catalyst activators. This is directly contrary to the teaching of WO 2004/024312.

Thus, in a first aspect, the present invention provides

A catalyst activator vessel for heat conditioning a catalyst, comprising:

a) a vessel for containing a catalyst charge having an internal diameter of at least 1.2 meters and/or an internal volume of at least 5 m$^3$;

b) a fluidisation grid plate disposed in said vessel, said fluidisation grid plate and having an upper major surface and a lower major surface;

c) an array of generally conical depressions in said upper major surface that overlap by less than 17%; and d) an array of holes perforating said fluidisation grid plate, said holes extending from at least some of said generally conical depressions through said lower surface.

The array of generally conical depressions are preferably in a regular array, by which is meant that the centre of each depression has at least two neighbouring depressions the centres of which are located equidistant from the depression in question. Most preferably the array is an array of equilateral triangles. In such an array the centre of a conical depression should have the centres of 6 neighbouring conical depressions surrounding it and equidistant from it. A portion of such an array is shown in FIG. 1.

Percentage overlap, as used herein (and as used in WO 2004/024312), refers to the amount, expressed as a percentage, by which the nominal diameter of a depression exceeds the centre-to-centre spacing between the depression and the nearest adjacent depression.

It should be noted that is a feature of the present invention that the array of generally conical depressions do "overlap", by which is meant that the nominal diameter of a depression exceeds the centre-to-centre spacing between the depression and the nearest adjacent depression. Put another way this means that the percentage overlap as used herein is greater than zero.

It is preferred that the array of generally conical depressions overlap by at least 10%, and most preferably by at least 15.5%. As noted above, a regular array of conical depressions with an overlap of 15.5% or above results in an array of regular hexagons at a surface. In this way no flat areas remain between the depressions across the main part of the grid.

Preferably the overlap is in the range 15.6% to 16.5%.

The regular array of generally conical depressions should cover the majority of the upper surface of the fluidisation grid plate (which may hereinafter also be referred to as "fluidisation grid", "grid plate" or simply "grid"). In general, however, there will be areas at the periphery of the grid and in the centre where the regular array elsewhere on the grid cannot be maintained. For example, the vessel is usually cylindrical, and outer edge of the grid is usually in the shape of a circle which fits therein, and there will be areas where it is not possible to maintain the same spacing and array as elsewhere.

In such areas, smaller diameter depressions may be used to minimise flat surfaces of the grid, such as described in WO 2004/024312, although some flat areas are likely to remain.

A significant advantage of the present invention compared to WO 2004/024312 is that less metal needs to be removed from the grid to form the array of depressions. This means, for a particular initial plate thickness, that more of the initial thickness is maintained in the final grid. Thus, for a particular initial plate thickness the final grid will be stronger. Alternatively, a thinner initial plate may be used for a required final thickness/strength of grid.

As well as avoiding waste metal, drilling less reduces the time to form the grid and the number of drill bits that may be required (since they wear or break less if used less).

Other than the reduction in overlap, the grid is generally preferably as described in WO 2004/024312.

The grid is preferably generally horizontally disposed within the vessel, at least in use. The grid need not be entirely horizontal but may have a concavity of 5 degrees or more below a horizontal plane, or it can be tilted somewhat out of a true horizontal orientation when in use. It is usually sloped towards its centre in order to aid catalyst withdrawal after activation through a central port of the grid.

The grid may be conical, with its apex at its lowest point.

The term "generally conical depressions" is intended to refer to depressions which are generally in the form of cones, although they will generally connect to a hole through the rest of the grid at their apex, and their bases may appear as hexagons or other shapes depending on the array.

Where the grid plate is concave or conical then the depressions may be vertically orientated or may be orientated perpendicular to the upper major surface.

Figure 2:
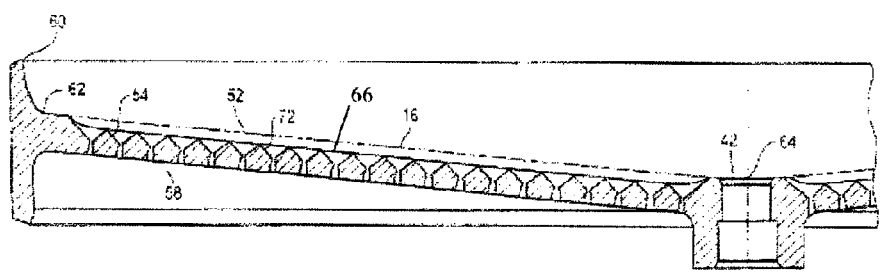

Similarly, "upper" and "lower" are defined with respect to the normal orientation of the grid when in use. In the case of a conical grid (with its apex at its lowest point) the upper surface would be the inner surface of the cone The invention will now be further described as below and as in the Figures, wherein:

FIG. 1 is a schematic showing a section of a regular triangular array of depressions as viewed from above, and FIG. 2 is a reproduction of FIG. 4 of WO 2004/024312 showing the section through the grid plate of WO 2004/024313.

FIG. 1 is a schematic showing a section of a regular triangular array as viewed from above. FIG. 1a shows how circles in the plane of the surface overlap in an array formed by drilling a series of cones into a flat plate. The centres of each cone are located in a regular triangular array. Thus, the centre of one cone is shown by reference numeral (1) and forms an equilateral triangle (shown as (2)) with the centres of two neighbouring cones equidistant therefrom. Where two neighbouring cones overlap, the overlap appears as a straight line (3), shown in dotted form in FIG. 1a at the intersections of two cones.

In the array shown each centre (1) actually has 6 neighbouring centres located equidistant therefrom, and the lines of overlap between the central depression and the six neighbours form a regular hexagon around each centre (1).

In practise, the circles are not visible at the surface and what is seen is an array of hexagons as shown in FIG. 1b.

FIG. 2 shows the grid plate of WO 2004/024313. The fluidisation grid plate 16 is normally generally horizontal, having an upper major surface 52 perforated with an array of generally conical depressions such as 54 and 56, a lower major surface 58, an outer flange 60 defining an outer margin 62, and a concave or lower centre 64 normally disposed below the level of the outer margin 62.

Compared to the same Figure in WO 2004/024312, to this Figure has also been added the label "66" for the physical surface formed by the array of conical depressions.

The present invention may be of generally the same overall structure as WO 2004/024312, except that the gap between the nominal surface 52 and the surface formed by the array of conical depressions 66 is reduced or is absent completely i.e. the surface formed by the array of conical depressions is coincident with the surface 52.

The vessel for containing a catalyst charge preferably has an internal diameter least 1.5 meters. The diameter is usually less than 3 m. Diameters in the range 1.5 to 2.5 meters are preferred. The vessel is usually, and preferably, a cylindrical vessel with a constant diameter. Where the diameter varies with height of the vessel above the fluidisation grid plate however, then the internal diameter referred to herein is the diameter at the fluidisation grid plate.

As defined herein, the grid plate has a nominal diameter equal to the internal diameter of the vessel in which it is disposed. In practise, the diameter over which the depressions may be present may be 2-10 cm smaller since it is difficult to drill close to the outer edge.

In terms of volume, the vessel for containing a catalyst charge may have a volume of at least 5 $m^3$. Such a volume is typically sufficient, allowing for bed expansion and for a freeboard above the bed within the vessel to allow activation of a batch of catalyst of bulk volume, in the absence of fluidising gas, of at least 2 $m^3$. The volume of the vessel may be at least 6 $m^3$, especially at least 8 $m^3$ and/or up to 20 $m^3$, for example, up to 12 $m^3$. For avoidance of any doubt, the volume of the vessel is the volume above the fluidisation grid and excludes the volume of any solids separation system such as filters or cyclones.

The vessel for containing the catalyst charge is preferably an inner vessel and is surrounded by an outer vessel, the gap between them forming a flue. In use, heated fluid, such as hot air may be passed into the flue to provide heat to the catalyst charge in the inner vessel. Alternatively, the vessel can be heated by a combination of hot air in the flue plus radiation from electric heaters, or any other means.

The details of such an arrangement are well-known to the person skilled in the art, as described in WO 2004/024312.

The activator vessel generally has a source of a fluidising medium, which is preferably dry air or an inert gas, such as nitrogen, although other gases, or mixtures of gases, or potentially liquids may find use as a fluidising medium. Combinations of fluidising medium may be used, for example, dry air followed by nitrogen.

In use, the fluidising medium passes through the array of holes perforating the fluidisation grid plate and into the catalyst charge located above the grid, thereby fluidising the charge.

Preferably, holes extend through said lower surface from each generally conical depression in the upper surface, and thereby form an array of a fluid paths extending upwardly through each of said holes and said generally conical depressions to pass a fluid through said fluidisation grid plate.

The fluidising medium after contact with the catalyst charge flows to effluent treatment and can then be recycled for reuse as fluidising medium or vented.

The pitch or spacing, being the distance between the centres of adjacent depressions, is generally between 2.5 and 5 cm, with values in the range 3.5 to 4.5 cm being preferred.

Thus, in a preferred regular triangular array the centre of each depression (other than those at the periphery which will have less) will have 6 neighbouring depressions the centres of which regularly spaced around it all at this distance.

The pitch can be specified to obtain a desired number of holes, and the number and diameter of holes specified to give a desired total required gas flow and velocity at the fluidisation interface.

One advantage of relatively low pitch is to increase the number of holes among which the flow is divided, so the distribution of the fluidising medium is more uniform and the fluidisation gas velocity at the fluidisation interface is not too high. Improved uniformity in the fluidisation medium, resulting from the shorter distances between adjacent jets or sources of the fluidisation medium, assures improved contact of the fluidisation medium with the catalyst. This improves the uniformity and quality of the catalyst. Maintaining acceptably low fluidisation gas velocity at the fluidisation interface reduces the chance or extent of possible attrition (particle size reduction or fracture) of the catalyst particles.

The nominal thickness of the fluidisation grid plate (the thickness before machining) according to the process of the present invention is preferably in the range 35 to 100 mm, and more preferably from 40 mm and/or up to 65 mm. In general, larger diameter fluidisation grid plates are required to be of larger nominal thickness in order to span the diameter of the vessel unless further support is provided, for example, at be centre of the fluidisation grid plate.

The depths of the generally conical depressions, as measured from the nominal upper surface, are usually less than 70% of the nominal plate thickness, preferably less than 60% and more preferably less than 50% of the nominal plate thickness.

The holes perforating said fluidisation grid plate and extending from at least some of said generally conical depressions through said lower surface need not be simple bores but may be compound bores having an upper portion of relatively lower diameter and an upper portion of relatively larger diameter. Such are again described in WO 2004/024312.

The fluidisation grid plate can be made of any suitable material that will withstand the conditions of activation. One example of a suitable material is an INCONEL 601 nickel-chromium-aluminium alloy. Other suitable materials include other INCONEL alloys or HASTELLOY alloys.

Most particularly, the catalyst activator of the present invention is suited for the activation of particulate metal oxide catalytic materials, especially such catalytic materials as are employed in polymerization reactions, and most especially polymerisation catalysts based on supported chromium oxide.

A representative method of preparing such catalysts is disclosed in U.S. Pat. No. 2,825,721.

The present invention also provides a process which can be used to activate relatively large batches of catalyst, generally of bulk volume, in the absence of fluidising gas, of at least 2 $m^3$, and preferably at least 2.5 $m^3$.

Thus, in a second aspect, the present invention provides a process for activating a polymerisation catalyst, which process comprises:

a) providing a catalyst activator vessel for heat conditioning the catalyst, said catalyst activator having a fluidisation grid plate disposed in said vessel, wherein
  i) said fluidisation grid plate has an upper major surface and a lower major surface,
  ii) an array of generally conical depressions in said upper major surface that overlap by less than 17%; and
  iii) an array of holes perforating said fluidisation grid plate, said holes extending from at least some of said generally conical depressions through said lower surface, b) introducing into said vessel a catalyst charge having a bulk volume, in the absence of fluidising gas, of at least 2 $m^3$, c) producing a fluidising medium into said vessel through the fluidisation grid plate in order to fluidise said catalyst charge, and d) heating the fluidised bed of the catalyst to activate said catalyst.

The activation is generally accomplished by heating the fluidised bed of the catalyst up to a defined temperature, holding for a defined period of time, and then cooling. During this process, the composition of the fluidisation medium might change.

Activation may be performed in several stages by heating sequentially to a series of two or more "hold temperatures" at each of which the fluidised bed of catalyst is held for defined periods of time. The activation may be performed with different activating gases at different stages.

The defined temperature and defined period of time (for each stage where there is more than one) can vary but the defined temperature in each stage is generally in the range of about 50 to 1000° C., preferably from 200° C. and/or up to 800° C., and the defined period of time is generally in the range of 1 to 72 hours, for example 1 to 12 hours.

The fluidisation medium is preferably dry air or an inert gas, such as nitrogen, although other gases, or mixtures of gases, or potentially liquids may find use as a fluidising medium.

The catalyst activator vessel in the second aspect of the present invention is preferably as described for the first aspect of the present invention.

The catalyst charge preferably has a bulk volume, in the absence of fluidising gas, of at least 2.5 $m^3$. Any suitable bulk volume above this can be activated, but the bulk volume is generally less than 10 $m^3$, and more usually less than 5 $m^3$.

The bed depth in the absence of fluidising gas is typically in the range 0.8 to 3 m.

The bulk volume and bed depth as used herein can be determined from the bulk density of the catalyst charge, which itself should be determined from the tapped bulk density measured according to ASTM D7481-09

The batch weight of the catalyst charge is dependent on the bulk density of the charge (prior to activation). Typical bulk densities for polymerisation catalysts are 120 to 300 kg/$m^3$, preferably 150 to 300 kg/$m^3$.

The batch weight is typically in the range 300-1200 kg, preferably 400 to 750 kg.

The fluidisation velocity may vary widely, but is preferably selected to give an expansion on fluidisation of 50-200% compared to the original bed bulk volume i.e. the volume of the fluidised bed is 1.5 to 3 times the non-fluidised bulk volume. The fluidisation velocity required depends on the bulk density of the charge as well as the expansion required.

Typically the fluidisation velocity is in the range 1 to 15 cm/s, with higher velocities being preferred for denser materials. For example, for a material with a bulk density of 150 kg/$m^3$ a velocity of 3-4 cm/s may be suitable, whereas for a material with a hulk density of 300 kg/$m^3$ a velocity of 10-12 cm/s may be required.

As used herein, fluidisation velocity s the linear flow rate at the top of the bed of fluidised catalyst in the activator vessel and above the fluidisation grid plate upper surface, not taking into account the volume of the catalyst particles. It can thus be easily determined by dividing the volumetric flow rate of the fluidisation medium by the cross-sectional area of the vessel at a point above the fluidisation grid plate.

In a further embodiment, the present invention also provides a process for activating a batch of polymerisation catalyst which comprises fluidising the batch of polymerisation catalyst in a fluidisation zone of an activator vessel, the height of the fluidisation zone being at least twice the diameter of the fluidisation zone.

Alternatively, this embodiment provides a process for activating a batch of polymerisation catalyst which comprises fluidising the batch of polymerisation catalyst in a fluidisation zone of an activator vessel, the height of the fluidised bed of catalyst being at least twice the diameter of the fluidisation zone.

In particular, it has been found it is possible to activate catalysts in deeper beds than had previously been considered efficient by increasing the height of the bed in the fluidised state in the activator. WO 2004/024312, for example, teaches that deeper beds are problematic because less activation air and more activation effluent contact each particle of catalyst. Because of this, catalysts have traditionally been activated by fluidising settled beds of about 4 feet (1.2 m) in depth to up to about twice this depth (100% expansion on fluidisation). It has now been found that significantly deeper beds can be activated in large diameter activator vessels without reducing the quality of the resulting catalyst by increasing the depth of the fluidised bed of catalyst.

In the further embodiments the expansion on fluidisation, which is the increase in volume on fluidisation compared to the settled volume of the bed should be above 100% i.e. the volume should at least double. Preferably the expansion is at least 120%, and more preferably at least 130%. The expansion is usually less than 300%, for example less than 200%.

In order to achieve the above expansions the fluidisation velocity is preferably in the range 6 to 15 cm/s, with higher velocities being preferred for denser materials and/or eater expansion.

The diameter of the fluidisation zone of the activator vessel is preferably at least 1 m, for example, at least 1.2 m.

The height of the fluidised bed of catalyst is at least twice the diameter and may be different depending on the size of the batch of catalyst. The height may be at least three times the diameter, for example at least four times the diameter. It is generally between 2 and 8 m, and preferably between 4 and 8 m. The height is measured from the top to the base of the fluidised bed, the base being generally defined by a fluidisation grid plate.

The height may be determined by any suitable technique. A specific example is the measurement of time averaged fluidised bed level using ultrasonic waves as described in WO 02/35206.

The fluidisation zone is usually, and preferably, a cylindrical vessel with a constant diameter. Where the diameter varies then the internal diameter referred to herein is the diameter as measured at the base of the fluidisation zone, which is generally the diameter at the fluidisation grid plate. For a particular activator the height of the fluidisation zone is a fixed value and is independent of the batch size, but should be sufficient to accommodate the largest fluidised volume of any different batches of catalyst to be activated in the activator. The height may be at least two times the diameter, for example at least four times the diameter. The height is preferably between 2 and 8 m.

Above the fluidisation zone there is generally provided a disengagement zone. The disengagement zone is above the top of the fluidised bed, and removes particles entrained out of the fluidised bed in the fluidising gas. The height of the disengagement zone will have been designed to be sufficient to ensure the required disengagement of the particles for any of the different batches which might be activated. The height of the disengagement zone may be between 1 to 3 meters, alternatively 1 to 2 bed diameters, alternatively between 1 to 2 times the height of the settled bed, alternatively between 0.25 to 0.75 times the height of the fluidisation zone. Typically one or more filters, preferably back-flushed sintered metal filters, are provided remove particles from the fluidising gas leaving the disengagement zone.

The disengagement zone may comprise an area of increased cross-section compared to the fluidisation zone which slows the linear velocity of the gas and allows particles to drop hack into the fluidisation zone.

Alternatively, and preferably, the disengagement zone is the same cross-sectional area as the fluidisation zone, such that the fluidisation zone and disengagement zone form a single cylindrical activator vessel. The activator vessel in alternatively be defined by a total height which corresponds to the combined height of the fluidisation and disengagement zones. The total height of the activator is usually between 3 and 11 m.

These embodiments of the present invention allow larger volumes of catalyst to be activated in a particular diameter activator. Thus, these embodiments also generally start with a relatively deep settled bed of catalyst. In particular, the settled bed usually has a depth between 1.8 and 3 m.

The settled bed of catalyst preferably has a bulk volume of greater than 1.5 m$^3$.

In yet a further embodiment, the present invention also provides a process for activating a batch of polymerisation catalyst in an activator vessel where the batch size is such that a settled bed of the catalyst in the activator vessel has a bulk volume of greater than 1.5 m$^3$ and a depth between 1.8 and 3 m.

The diameter is preferably at least 1.2 and most preferably as recited for the preferred aspects of the first and second embodiments.

In these further embodiments it is generally preferred the batch size is such that a settled bed of the catalyst in the activation vessel has a bulk volume of greater than 2 m$^3$. The bulk volume is more preferably at least 2.5 m$^3$. Any suitable bulk volume above this can be activated, but the bulk volume is generally less than 10 m$^3$, and more usually less than 5 m$^3$.

The settled bulk volume and settled bed depth as used herein can be determined from the bulk density of the catalyst charge, which itself should be determined from the tapped bulk density measured according to ASTM D7481-09.

As noted above, it has now been found that significantly deeper beds can be activated in larger diameter activator vessels without reducing the quality of the resulting catalyst.

One advantage of this embodiment is that fluidization gas is more efficiently utilised. It has been found that, by operating with a deeper bed depth, less fluidising gas per kg of activated catalyst is used, compared to shallower beds. Generally, the gasses used have to be of high purity, so improving the efficiency of their use results in a more economical installation and operating cost. Also, this results in less energy being required to heat the gas.

The fluidisation zone of the activator vessel in this aspect will generally have a fluidisation grid at its base. Any suitable grid may be used, including as described in the first and second aspects of the present invention or as described in WO 2004/024312.

The invention claimed is:

1. A process for activating a batch of polymerisation catalyst which comprises fluidising the batch of polymerisation catalyst in a fluidisation zone of an activator vessel, wherein the activator vessel comprises a fluidisation zone and a disengagement zone above the fluidisation zone, the diameter of the fluidisation zone of the activator vessel being at least 1 m, the height of the fluidised bed of catalyst being at least twice the diameter of the fluidisation zone and the height of the disengagement zone being between 1 to 3 m.

2. A process according to claim 1 wherein the height of the fluidised bed of catalyst is at least three times the diameter, for example at least four times the diameter.

3. A process according to claim 1 wherein the height of the fluidised bed of catalyst is between 2 and 8 m, and preferably between 4 and 8 m.

4. A process according to claim 1 wherein the expansion on fluidisation is above 100%, such as at least 120%.

5. A process according to claim 1 wherein the diameter of the fluidisation zone of the activator vessel is at least 1.2 m, and preferably at least 1.5 m.

6. A process according to claim 1 wherein the settled bed has a depth between 1.8 and 3 m.

7. A process according to claim 1 wherein the settled bed has a bulk volume of greater than 1.5 m$^3$.

8. A process according to claim 1 wherein the height of the disengagement zone is between 1 to 2 bed diameters.

9. A process according to claim 1 wherein the height of the disengagement zone is between 0.25 to 0.75 times the height of the fluidisation zone.

10. A process according to claim 1 wherein the disengagement zone has the same cross-sectional area as the fluidisation zone such that the fluidisation zone and disengagement zone form a single cylindrical activator vessel having a total height between 3 and 11 m.

11. A process for activating a batch of polymerisation catalyst which comprises fluidising the batch of polymerisation catalyst in a fluidisation zone of an activator vessel, the diameter of the fluidisation zone of the activator vessel being at least 1.2 m and the height of the fluidised bed of catalyst being at least twice the diameter of the fluidisation zone.

12. A process according to claim 11 wherein the height of the fluidised bed of catalyst is at least three times the diameter, for example at least four times the diameter.

13. A process according to claim 11 wherein the height of the fluidised bed of catalyst is between 2 and 8 m, and preferably between 4 and 8 m.

14. A process according to claim 11 wherein the expansion on fluidisation is above 100%, such as at least 120%.

15. A process according to claim 11 wherein the diameter of the fluidisation zone of the activator vessel is at least 1.5 m.

16. A process according to claim 11 wherein the settled bed has a depth between 1.8 and 3 m.

17. A process according to claim 11 wherein the settled bed has a bulk volume of greater than 1.5 m$^3$.

18. A process according to claim 11 wherein the activator vessel comprises a fluidisation zone and a disengagement zone above the fluidisation zone, the height of the disengagement zone being between 1 to 3 m.

19. A process according to claim 11 wherein the activator vessel comprises a fluidisation zone and a disengagement zone above the fluidisation zone, the height of the disengagement zone being between 1 to 2 bed diameters.

20. A process according to claim 11 wherein the activator vessel comprises a fluidisation zone and a disengagement zone above the fluidisation zone, the disengagement zone having the same cross-sectional area as the fluidisation zone such that the fluidisation zone and disengagement zone form a single cylindrical activator vessel having a total height between 3 and 11 m.

* * * * *